(12) United States Patent
Murakami

(10) Patent No.: US 8,383,727 B2
(45) Date of Patent: *Feb. 26, 2013

(54) ADHESIVE AND LAMINATE USING THE SAME

(75) Inventor: Shuichi Murakami, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 579 days.

This patent is subject to a terminal disclaimer.

(21) Appl. No.: 11/886,260

(22) PCT Filed: Mar. 13, 2006

(86) PCT No.: PCT/JP2006/304936
§ 371 (c)(1),
(2), (4) Date: Sep. 13, 2007

(87) PCT Pub. No.: WO2006/098290
PCT Pub. Date: Sep. 21, 2006

(65) Prior Publication Data
US 2008/0152904 A1 Jun. 26, 2008

(30) Foreign Application Priority Data
Mar. 17, 2005 (JP) .................. 2005-076399

(51) Int. Cl.
*C08L 51/00* (2006.01)
*B32B 7/12* (2006.01)

(52) U.S. Cl. ............ 525/70; 525/326.1; 525/333.7; 428/355 R; 428/355 EN; 428/500

(58) Field of Classification Search ............ 428/355 R, 428/355 EN, 355 CN, 355 AC, 500; 525/326.1, 525/333.7, 70
See application file for complete search history.

(56) References Cited

U.S. PATENT DOCUMENTS

| | | | |
|---|---|---|---|
| 4,900,612 A | 2/1990 | Sato et al. | |
| 7,112,625 B2 * | 9/2006 | Nakayama et al. | 524/504 |
| 2007/0173603 A1 * | 7/2007 | Murakami et al. | 525/63 |
| 2009/0110945 A1 * | 4/2009 | Yasui et al. | 428/523 |

FOREIGN PATENT DOCUMENTS

| | | |
|---|---|---|
| JP | 55-137176 | 10/1980 |
| JP | 61-270155 | 11/1986 |
| JP | 62-158043 | 7/1987 |
| JP | 03-250054 | 11/1991 |
| JP | 2002-264281 | 9/2002 |
| JP | 2002-273838 | 9/2002 |
| JP | 2004-204207 | 7/2004 |
| JP | 2005-060592 | 3/2005 |
| WO | WO 03/087219 * | 10/2003 |
| WO | WO 2005097840 A1 * | 10/2005 |

OTHER PUBLICATIONS

Machine translation of JP 2002-273838.*
Rosen, S. L. Fundamental Principles of Polymeric Materials $2^{nd}$ Edition John Wiley & Sons, Inc., New York et al, pp. 39-46 published in Jan. 1993.*
Supplementary European Search Report, issued May 4, 2010, for European Patent Application 06729001.5, 5 pgs.
Database WPI Week 200329, Thomson Scientific, London, GB; AN, 2003-292951, XP002578846, 2 pgs.
Database WPI Week 200349, Thomson Scientific, London, GB; AN, 2003-515958, XP002578847, 2 pgs.
Database WPI Week 200525, Thomson Scientific, London, GB; AN, 2005-236456, XP002578848, 2 pgs.

* cited by examiner

*Primary Examiner* — Irina S Zemel
*Assistant Examiner* — Jeffrey Lenihan
(74) *Attorney, Agent, or Firm* — Foley & Lardner LLP

(57) ABSTRACT

Provided is a carbodiimide-modified, high-density polyolefin-based adhesive with minimal lowering of adhesion power even in a high temperature environment, and a laminate having excellent interlayer adhesion power at high temperatures prepared by using the adhesive.

Provided is an adhesive obtained by reaction of a polyolefin (A) having a group reactive with a carbodiimide group and a compound (B) containing a carbodiimide group in the presence of an unmodified polyolefin (C), having a ratio of a peak intensity at 2130 to 2140 $cm^{-1}$ to a peak intensity at 1470 $cm^{-1}$ of 50% or less (but not including 0%).

5 Claims, No Drawings

ADHESIVE AND LAMINATE USING THE SAME

TECHNICAL FIELD

The present invention is related to a novel adhesive and a laminate using the same.

Concretely, the present invention is related to an adhesive (D) which is obtained by reaction of a high-density polyolefin (A) having a group reactive with a carbodiimide group and a compound (B) containing a carbodiimide group in the presence of an unmodified polyolefin (C), and its application to a laminate with a polar resin (F) and/or polyolefin (G).

BACKGROUND ART

It is already known that a composition of random copolymers of ethylene and α-olefin modified by grafting of an unsaturated carboxylic acid or its derivatives was used as an adhesive composition for such a polar resin as polyester like polyethylene terephthalate or polycarbonate that has poor adhesiveness to polyolefin (refer to Patent Documents 1 and 2). Although this type of an ethylene-based modified resin composition has excellent adhesiveness at an ambient temperature, it has a problem of peeling at high temperatures due to substantial lowering of the adhesion power under such a condition that a laminate with polyethylene terephthalate is used in a hot water at high temperature.

To improve the adhesion strength at high temperatures, an adhesive resin composition comprising a modified polyolefin resin composition is already known (refer to Patent Document 3). However, it is not satisfactory as a high-temperature heat-resistant adhesive because of an insufficient reactivity of the functional group used for the modification.

[Patent Document 1] Japanese Patent Laid-Open Publication No. S61-270,155
[Patent Document 2] Japanese Patent Laid-Open Publication No. S62-158,043
[Patent Document 3] Japanese Patent Laid-Open Publication No. 2002-273,838

DISCLOSURE OF THE INVENTION

Problems to be Solved by the Invention

An object of the present invention is to provide a carbodiimide-modified, high-density polyolefin-based adhesive with minimal lowering of adhesion power even in a high temperature environment, and a laminate having excellent interlayer adhesion power at high temperatures prepared from the adhesive.

Means for Solving the Problems

The inventors of the present invention performed intensive studies and have found that an adhesive (D) having a carbodiimide moiety and a polyolefin moiety on the same backbone can be efficiently produced by reaction of a polyolefin (A) having a group reactive with a carbodiimide group and a compound (B) containing a carbodiimide group in the presence of an unmodified polyolefin (C) under a specific condition so that it becomes possible to improve the adhesion power and furthermore, to effectively suppress the decrease of the adhesion power of the adhesive (D) at high temperatures in the case that the polyolefin (A) is a high-density resin.

That is, the present invention is related to an adhesive obtained by reaction of a polyolefin (A) having a group reactive with a carbodiimide group and a compound (B) containing a carbodiimide group in the presence of an unmodified polyolefin (C), and having a ratio of peak intensity at 2130 to 2140 $cm^{-1}$ to peak intensity at 1470 $cm^{-1}$ at 50% or less (not including 0%) determined by infrared absorption spectroscopy. It is preferred to set the reaction temperature in the range from 230 to 280° C. for the reaction of the polyolefin (A) having a group reactive with a carbodiimide group and the compound (B) containing a carbodiimide group in the presence of the unmodified polyolefin (C).

It is also preferred that in the adhesive a raw material of the polyolefin (A) having a group reactive with a carbodiimide group, is a polyolefin having a density in the range from 0.925 to 0.980 $g/cm^3$.

It is preferred that the polyolefin (A) having a group reactive with a carbodiimide group, is a polymer which meets the following equation (1):

$$0.3 < Mn/(100 * f/M) < 3.0 \qquad (1)$$

(wherein f denotes a formula weight (g/mol) of a compound having a group reactive with a carbodiimide group, M denotes a content (wt %) of residue of the compound having a group reactive with a carbodiimide group, and Mn denotes a number-average molecular weight of polyolefin (A)).

Furthermore, the present invention is a laminate containing at least one layer of the above-described carbodiimide-modified polyolefin-based adhesive (D), especially a laminate which has the adhesive (D) layer placed between a polar resin (F) layer and a polyolefin (G) layer or another polar resin (F') layer which is different from the polar resin (F).

Effects of the Invention

The carbodiimide-modified polyolefin-based adhesive (D) of the present invention is a composition having excellent adhesiveness at high temperatures. A laminate having excellent interlayer adhesion power at high temperatures can be obtained by using the carbodiimide-modified polyolefin-based adhesive (D) of the present invention.

BEST MODE FOR CARRYING OUT THE INVENTION

The present invention is described in more detail below.

The carbodiimide-modified polyolefin-based adhesive (D) of the present invention can be obtained by reaction of a polyolefin (A) having a group reactive with a carbodiimide group and a compound (B) containing a carbodiimide group in the presence of an unmodified polyolefin (C), and has a ratio of peak intensity at 2130 to 2140 $cm^{-1}$ to peak intensity at 1470 $cm^{-1}$ at 50% or less (not including 0%) determined by infrared absorption spectroscopy.

Each component is explained below. Polyolefin (A) having a group reactive with a carbodiimide group A polyolefin (A) having a group reactive with a carbodiimide group of the present invention can be obtained by incorporating a compound (A) having a group reactive with a carbodiimide group, into a polyolefin.

The compound (A) having a group reactive with a carbodiimide group is a compound having an active hydrogen-containing group reactive with a carbodiimide group, and specifically includes a compound having a group derived from a carboxylic acid, an amine, an alcohol, a thiol or the like. Among them, a compound having a group derived from a carboxylic acid is preferable; especially an unsaturated carboxylic acid and/or its derivatives are more preferable. In addition to such a compound having an active hydrogen-containing group, a compound having a group which can be easily converted to an active hydrogen-containing group in the presence of water may also be preferably used, and includes specifically a compound having an epoxy group or glycidyl group. One kind or two or more kinds of the compounds (A) having a group reactive with a carbodiimide group may be used in the present invention.

In the case where an unsaturated carboxylic acid and/or derivatives thereof are used as a compound (A) having a group reactive with a carbodiimide group in the present invention, an unsaturated compound having one or more carboxyl groups, an unsaturated compound having one or more carboxylic anhydride groups, or their derivatives can be used, wherein the unsaturated group includes a vinyl, vinylene, unsaturated cyclic hydrocarbon group or the like. Specific examples include unsaturated carboxylic acids such as acrylic acid, methacrylic acid, maleic acid, fumaric acid, tetrahydrophthalic acid, itaconic acid, citraconic acid, crotonic acid, isocrotonic acid, norbornene dicarboxylic acid, bicyclo[2.2.1]hept-2-ene-5,6-dicaroxylic acid, acid anhydrides thereof and derivatives thereof (for example, acyl halides, amides, imides, esters, and so on). Specific examples include malenyl chloride, malenyl imide, maleic anhydride, itaconic anhydride, citraconic anhydride, tetrahydrophthalic anhydride, bicyclo[2.2.1]hept-2-ene-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo[2.2.1]hept-2-ene-5,6-dicarboxylate, hydroxyethyl (meth)acrylate, hydroxypropyl (meth)acrylate, glycidyl (meth)acrylate, aminoethyl methacrylate, aminopropyl methacrylate and the like.

As the compound (A) having a group reactive with a carbodiimide group, the unsaturated carboxylic acids and/or their derivatives may be used singly or in a combination of two or more. Among them, maleic anhydride, (meth)acrylic acid, itaconic anhydride, citraconic anhydride, tetrahydrophthalic anhydride, bicyclo[2.2.1]hept-2-ene-5,6-dicarboxylic anhydride, hydroxyethyl (meth)acrylate, glycidyl methacrylate, and aminopropyl methacrylate are preferable. Furthermore, dicarboxylic anhydrides such as maleic anhydride, itaconic anhydride, citraconic anhydride, tetrahydrophthalic anhydride, bicyclo[2.2.1]hept-2-ene-5,6-dicarboxylic anhydride and the like are particularly preferable.

A conventional method can be applied to incorporate a compound (A) having a group reactive with a carbodiimide group, into a polyolefin; for example, graft copolymerization of a compound (A) having a group reactive with a carbodiimide group, onto a polyolefin main chain, or radical copolymerization of an olefin with a compound (A) having a group reactive with a carbodiimide group, can be exemplified.

The graft copolymerization and radical copolymerization are explained separately in more detail below.

<Graft Copolymerization>

The polyolefin (A) having a group reactive with a carbodiimide group of the present invention can be obtained by grafting a compound (A) having a group reactive with a carbodiimide group onto a main chain of polyolefin.

(Polyolefin as Main Chain)

A polyolefin used as a main chain is a polymer composed of an aliphatic α-olefin having 2 to 20 carbon atoms, a cyclic olefin, and a non-conjugated diene as main components, preferably a polymer composed of an α-olefin having 2 to 10 carbon atoms, and more preferably an α-olefin having 2 to 8 carbon atoms as a main component. These olefins may be used singly or in a combination of two or more kinds, and a content of the olefin used as a comonomer is usually 50 mol % or less, preferably 40 mol % or less, and more preferably 30 mol % or less. Either a homo-polymer or copolymer of ethylene, propylene, 1-butene, 4-methyl-1-pentene, 3-methyl-1-butene, 1-hexene, 1-octene, tetracyclododecene, or norbornene is preferably used in the present invention. Either isotactic or syndiotactic structure of these polyolefins may be used and furthermore, the stereoregularity of the polymer is not necessarily specified.

A density of a polyolefin used for the grafting reaction, that is, the density of a polyolefin (A) having a group reactive with a carbodiimide group is usually in the range from 0.8 to 1.2 g/cm$^3$, preferably from 0.90 to 1.1 g/cm$^3$, and more preferably from 0.925 to 1.0 g/cm$^3$.

A melt flow rate (MFR) of the polyolefin at 190° C. with a load of 2.16 kg according to the ASTM D1238 is usually in the range from 0.01 to 500 g/10 min, preferably from 0.05 to 200 g/10 min, and more preferably from 0.1 to 100 g/10 min. So far as the density and the MFR of the polyolefin fit the above-described ranges, especially, the density and the MFR of the modified copolymer by grafting also fit the same ranges, and it is easy to handle the resulting polymer.

Crystallinity of a polyolefin used for the grafting is usually 2% or more, preferably 5% or more, and more preferably 10% or more. If the crystallinity of a polyolefin fits this range, it is easy to handle such a modified copolymer after the grafting.

A number-average molecular weight (Mn), determined by gel permeation chromatography (GPC), of a polyolefin used for the grafting is preferably in the range from 5,000 to 500,000, and more preferably from 10,000 to 100,000. It is easy to handle such a polymer if the average molecular weight (Mn) fits this range. If the comonomer content of an ethylene-based polyolefin used is 10 mol % or less, the average molecular weight (Mn) can be determined in terms of the polyethylene. If the comonomer content is 10 mol % or more, the Mn can be determined in terms of ethylene-propylene (based on an ethylene content of 70 mol %).

The above-mentioned polyolefin may be produced by a conventional method, for example, using a titanium-based catalyst, a vanadium-based catalyst, a metallocene-based catalyst, or the like. Either resin or elastomer type of the polyolefin may be used for the grafting. Furthermore, either isotactic or syndiotactic structure of the polyolefin may be used. There is no restriction on the stereoregularity of the polymer as well. In other words, any commercially available polyolefin may be used as it is.

(Graft Polymerization)

When a polyolefin (A) having a group reactive with a carbodiimide group of the present invention is obtained by graft polymerization, a polyolefin used as a main chain may be graft copolymerized with a compound having a group reactive with a carbodiimide group, optionally, in the presence of other ethylenic unsaturated monomer(s) and a radical initiator.

Any synthetic approach to the grafting of a compound having a group reactive with a carbodiimide group to a polyolefin main chain may be applied with no restriction; for example, solution method, melt kneading method, or other known methods.

<Radical Copolymerization>

A polyolefin (A) having a group reactive with a carbodiimide group of the present invention may also be obtained by radical copolymerization of olefin(s) and a compound (A) having a group reactive with a carbodiimide group, wherein the olefin(s) may be the same as the olefin(s) used for synthesis of the above-mentioned polyolefin used for the grafting as a main chain, and the compound (A) having a group reactive with a carbodiimide group may be the same as mentioned above.

Any known synthetic approach to the radical copolymerization of olefin(s) and a compound having a group reactive with a carbodiimide group, can be applied with no restriction.

(Composition of Polyolefin (A) Having a Group Reactive with a Carbodiimide Group)

A content of a compound (A) having a group reactive with a carbodiimide group in a polyolefin (A) having a group reactive with a carbodiimide group of the present invention is usually in the range from 0.1 to 10 wt %, preferably from 0.1 to 3.0 wt %, and more preferably from 0.1 to 2.0 wt %. If the content of the compound (A) having a group reactive with a carbodiimide group exceeds the above-described range, the compound (A) may react with a compound (B) containing a carbodiimide group to form a crosslinkage, so that it is difficult to produce an adhesive (D).

On the other hand, if the content of the compound (A) having a group reactive with a carbodiimide group in a polyolefin (A) having a group reactive with a carbodiimide group of the present invention is too low, although production of an adhesive (D) still is possible, an extent of the bonding between a compound (B) containing a carbodiimide group used as a backbone of the adhesive (D) and the polyolefin (A) becomes so small that adhesion power of the resulting adhesive (D) tends to be too small.

To prevent the crosslinking, it is preferred to set a number-average molecular weight of a polyolefin (A) having a group reactive with a carbodiimide group as low as possible, and a molar ratio of a compound (A) having a group reactive with a carbodiimide group to a polyolefin copolymer (A) as low as possible. In other words, if the number of a compound (A) having a group reactive with a carbodiimide group on the molecular chain of a polyolefin (A) having a group reactive with a carbodiimide group is close to one and not a plural number, a compound (B) containing a carbodiimide group may undergo reaction at the carbodiimide group (N=C=N) with a compound (A) having a group reactive with a carbodiimide group, resulting in bonding without crosslinking and gelation.

In the present invention, by controlling the number-average molecular weight (Mn) of a polyolefin (A) having a group reactive with a carbodiimide group and the content of a compound (A) having a group reactive with a carbodiimide group, crosslinking occurs in the production of an adhesive (D) without lowering of production stability. Further, it is possible to obtain sufficient adhesion power of a laminate prepared by using the adhesive (D). That is, the polyolefin (A) having a group reactive with a carbodiimide group in the present invention preferably satisfies the following equation (1):

$$0.1 < Mn/(100 * f/M) < 6 \quad (1)$$

(wherein f denotes a formula weight (g/mol) of a compound (A) having a group reactive with a carbodiimide group, M denotes a content (wt %) of a compound (A) having a group reactive with a carbodiimide group, and Mn denotes a number-average molecular weight of a polyolefin (A)).

Furthermore, from the viewpoint of production stability, namely, to prevent the crosslinking, it is more preferable to satisfy the following equation (2), and most preferably, the equation (3).

$$0.3 < Mn/(100 * f/M) < 3 \quad (2)$$

$$0.5 < Mn/(100 * f/M) < 2.8 \quad (3)$$

It is possible to stably produce the adhesive (D) without crosslinking, if the above-described relationship of the number-average molecular weight of the polyolefin (A) having a group reactive with a carbodiimide group and the compound (A) having a group reactive with a carbodiimide group is satisfied.

In the case where the polyolefin (A) having a group reactive with a carbodiimide group of the present invention is obtained by graft polymerization, such an ethylene-rich resin as a linear low-density polyethylene used as a polyolefin to be the main chain for grafting tends to be more easily crosslinked compared with such an α-olefin-rich resin as ethylene-butene copolymer. Therefore, in the case where such an ethylene-rich resin is used as the main chain for grafting, the closer the number of a compound having a group reactive with a carbodiimide group present on the molecular chain of the polyolefin (A) is to unity, that is, the lower the parameter of the above-described equation is, the easier the prevention of the crosslinking is.

A number-average molecular weight may be determined by an ordinary method of the measurement of the molecular weight of a polymer, for example, GPC, light scattering, low-angle light scattering photometry, vapor pressure osmosis, membrane osmosis, and so on.

A melt flow rate (MFR) of a polyolefin (A) having a group reactive with a carbodiimide group of the present invention with a load of 2.16 kg at 190° C. according to the ASTM D1238 is usually in the range from 0.01 to 500 g/10 min, and preferably from 0.05 to 100 g/10 min. Adhesion power of a resultant adhesive (D) is excellent, so far as the MFR fits this range.

In the case where the adhesion power is measured by a peeling method using a sample prepared by hot press molding with two base materials sandwiching a 100 micrometer-thick adhesive layer, the lower the MFR of a polyolefin used is and the longer the polymer chain is, the stronger the adhesion strength of an adhesive (D) is. In the case where a sample is prepared by casting to make a 30 to 50 micrometer-thick film, the reverse tendency is obtained. That is, when the adhesion power is measured by the peeling method using a cast film, the higher the MRF of a polyolefin is, the stronger the adhesion power is, probably due to better fluidity of a shorter polymer chain at the interface.

The density of a polyolefin (A) having a group reactive with a carbodiimide group, is usually in the range from 0.8 to 1.2 g/cm³, preferably from 0.90 to 1.1 g/cm³, and more preferably from 0.925 to 1.0 g/cm³.

Among polyolefins (A) having the above-mentioned range of density, crystalline polyolefins such as polyethylene, polypropylene, polybutene-1, poly-4-methyl pentene-1, and their copolymers with α-olefin(s) which are grafted with maleic anhydride are preferred, and furthermore, a polyethylene grafted with maleic anhydride is more preferable, wherein the density of the polyethylene used is preferably 0.920 g/cm³ or more, and more preferably fits the range from 0.925 g/cm³ to 0.980 g/cm³. If the polyolefin (A) having a group reactive with a carbodiimide group has a low density and low crystallinity, the adhesion power determined by a peeling test at high temperatures tends to be lowered. The density of a polyolefin (A) having a group reactive with a carbodiimide group is preferably higher.

Compound (B) Containing a Carbodiimide Group

A compound (B) containing a carbodiimide group of the present invention is a polycarbodiimide which has a repeating unit defined by the following equation (4):

$$—N=C=N—R_1— \quad (4)$$

(wherein $R_1$ denotes a divalent organic group)

There is no specific synthetic method of the polycarbodiimide, and the polycarbodiimide may be, for example, synthesized by reaction with an organic polyisocyanate in the presence of a catalyst promoting the reaction of carbodiimidization of an isocyanate group.

A number-average molecular weight (Mn) of a compound (B) containing a carbodiimide group of the present invention, determined by gel permeation chromatography (GPC) in terms of polystyrene, is usually in the range from 400 to 500,000, preferably from 1,000 to 10,000, and more preferably from 2,000 to 4,000. Adhesion power of an adhesive (D) is excellent so far as the number average molecular weight (Mn) fits this range.

A polycarbodiimide used as the compound (B) containing a carbodiimide group in the present invention may include, for example, a mono-carbodiimide, and may be used singly or also as a mixture of plural compounds.

A commercially available compound containing a carbodiimide group may be used as it is. An example of such a commercially available one is Carbodilite HMV-8CA or LA1, produced by NISSHINBO INDUSTRIES, INC.

The content of a compound (B) containing a carbodiimide group and a content of a carbodiimide group introduced in an adhesive (D) can be determined by using C-NMR, IR, or titration method, and can be referred to as a carbodiimide equivalent. A detection peak for the measurement can be observed at 130 to 142 ppm with C-NMR and at 2130 to 2140 cm$^{-1}$ with IR.

Unmodified Polyolefin (C)

Examples of the unmodified polyolefin (C) of the present invention are the same as the above-mentioned polyolefin main chain (A). Preferable ones may be selected depending on application and adhesion substrate, and include, for example, low-density polyethylene, high-density polyethylene, linear low-density polyethylene, polypropylene, ethylene/propylene copolymer, ethylene/$\alpha$-olefin copolymer, ethylene/propylene copolymer, ethylene/butene copolymer, ethylene/hexene copolymer, ethylene/octene copolymer, polybutene-1, poly-4-methyl-1-pentene, poly-3-methylbutene, ethylene/tetracyclododecene copolymer and related cyclic polyolefins. The following compounds are added preferably as a third component, for example, 5-ethylidenenorbornene, 5-methylnorbornene, 5-vinylnorbornene, dicyclopentadiene, rubbers such as ethylene/propylene/nonconjugated diene copolymer (EPDM) using a nonconjugated diene such as 1,4-pentadiene and the like or ethylene/propylene/butene terpolymer. These may be used singly or combined together.

When an adhesive is used at high temperatures near 100° C., and/or in contact with such a material as gasoline or oil that swells a polyolefin, a polyolefin having a high melting point or high crystallinity such as polypropylene, high-density polyethylene or linear low-density polyethylene is preferably used.

The above-mentioned polyolefins may be produced by a conventionally known method, for example, using a titanium catalyst, a vanadium catalyst, a metallocene catalyst or the like.

Either resin or elastomer type of a polyolefin may be used. Either isotactic or syndiotactic structure of a polyolefin may be used. Furthermore, there is no restriction on stereoregularity of the polymer used. A commercially available polyolefin may be used as it is.

Adhesive (D)

The adhesive (D) of the present invention may be obtained by reaction of a polyolefin (A) having a group reactive with a carbodiimide group with a compound (B) containing a carbodiimide group in the presence of an unmodified polyolefin (C), preferably at a temperature of 230° C. or higher. Specifically, it may be obtained by a melt kneading method accompanying reactions such as melt modification, but not limited to it.

Some cases of the melt kneading method are shown below. The reaction of a polyolefin (A) having a group reactive with a carbodiimide group and a compound (B) containing a carbodiimide group in the presence of an unmodified polyolefin (C) is carried out at a temperature of 230° C. or higher without any other specific conditions, but for example, by placing a polyolefin (A) having a group reactive with a carbodiimide group, a compound (B) containing a carbodiimide group and an unmodified polyolefin (C) simultaneously or successively in a vessel such as a Henschel mixer, a V-type blender, a tumbler blender, a ribbon blender or the like, followed by melt kneading with a uni-axial extruder, a multi-axial extruder, a kneader, a Bunbury mixer or the like. Especially, the use of such a machine that has a strong power of kneading such as a multi-axial extruder, a kneader, a Bunbury mixer or the like is preferable, because it is possible to obtain a polymer composition having all the components more uniformly dispersed and reacted.

For feeding a polyolefin (A) having a group reactive with a carbodiimide group, a compound (B) containing a carbodiimide group and an unmodified polyolefin (C) to an extruder, any of the following methods may be employed: a method of supplying all the components through a hopper after premixing, or a method of supplying part of the components through a hopper and the rest of the components through an inlet disposed at a location between the vicinity of the hopper and the extruder tip.

The temperature for melt kneading of the above-described components is set at a value higher than a melting point of a component which has the highest melting point among all the components used. Concretely, it is usually in the range from 180 to 300° C., preferably from 230 to 280° C., and more preferably from 250 to 270° C.

The adhesive (D) of the present invention has excellent fluidity at 190° C. The melt flow rate (MFR) of the adhesive (D) of the present invention at 190° C. with a load of 2.16 kg is usually in the range from 0.01 to 100 g/10 min, preferably from 0.1 to 50 g/10 min, and more preferably from 1 to 20 g/10 min. The adhesiveness and formability of the adhesive (D) is excellent so far as the MFR fits this range.

As the content of the compound (B) containing a carbodiimide group in producing the adhesive (D) of the present invention, the content of a carbodiimide group per 100 g of the adhesive (D) obtained by reacting a polyolefin (A) having a group reactive with a carbodiimide group, a compound (B) containing a carbodiimide group and an unmodified polyolefin (C) is usually set in the range from 0.5 to 50 mmol, preferably from 1 to 20 mmol, and more preferably from 2 to 10 mmol. If the carbodiimide content is too low, the adhesion strength becomes too low, because the number of reaction sites per unit area at the interface between the adhesive and the polar resin which is expected to exhibit adhesiveness is too small. On the contrary, if it is too large, the formability becomes too poor and the adhesion power is lowered as well.

Furthermore, it is important in the adhesive (D) of the present invention to control the reaction between a group (A) reactive with a carbodiimide group of the polyolefin (A) and a carbodiimide group of the compound (B) containing a carbodiimide group. An extent of the reaction between the group (A) reactive with the carbodiimide group of the polyolefin (A) having a group reactive with a carbodiimide group and the carbodiimide group of the compound (B) containing a carbodiimide group may be measured, for example, by the following method.

Infrared spectra of each of heat-pressed sheets of the polyolefin (A) having a group reactive with a carbodiimide group, and of the adhesive (D) of the present invention obtained by reaction of the polyolefin (A) having a group reactive with a carbodiimide group and the compound (B) containing a carbodiimide group are separately recorded by using an infrared absorption spectrometer. From thus obtained IR charts, the extent of the reaction may be determined by calculating a change of the absorbance, that is, the peak intensity before and after the reaction with the compound (B) containing a carbodiimide group at the absorption band characteristic of a group reactive with a carbodiimide group of the polyolefin (A), and that of the adhesive (D) of the present invention (for example, 1790 cm$^{-1}$ in case of maleic anhydride) using the following equation.

$$\text{Extent of the reaction}(\%) = (X/Y) * 100$$

wherein:
X=a difference in the peak intensity of characteristic band of the group reactive with a carbodiimide group before and after the reaction (Before reaction (A)—After reaction (D))
Y=the peak intensity of the group reactive with a carbodiimide group before the reaction (A).

The extent of the reaction of the adhesive (D) of the present invention is usually in the range from 40 to 100%, preferably from 60 to 100%, and more preferably from 70 to 100%.

Further, the adhesive (D) of the present invention may be obtained by reaction of a carbodiimide group (NCN) of the above-mentioned polycarbodiimide with a compound (A) having a group reactive with a carbodiimide group, so that some amounts of the carbodiimide group are consumed during the reaction and the remaining carbodiimide group bonded as the same molecular chain of the polyolefin group contributes to adhesiveness to a polar resin (F). The carbodiimide residue is due to stretching vibration of the N=C=N group observed at 2130 to 2140 cm$^{-1}$ in the IR measurement, and the magnitude of the peak may be regarded as an amount of the carbodiimide residue. A ratio (percentage) of the peak intensity to a peak intensity of an internal standard set at 1470 cm$^{-1}$ characteristic of scissor vibration of the $CH_2$ moiety of a polyolefin is preferably 50% or less, and more preferably 40% or less. If this ratio exceeds the above-described range, the adhesion performance or formability is lowered due to an excess amount of a free carbodiimide group with respect to the polyolefin (A) having a group reactive with a carbodiimide group. If this ratio is 0, all the carbodiimide group of the blended carbodiimide is totally consumed in the reaction with maleic anhydride, implying that there is no residual carbodiimide group contributing to the ensuing adhesion, and thus such a case is not relevant in the present invention. A lower-limit value of the ratio of a peak intensity is preferably 10% or more, and more preferably 20% or more, from a viewpoint of the adhesion power.

Two or more kinds of a polyolefin (A) having a group reactive with a carbodiimide group, and an unmodified polyolefin (C) are used in the adhesive (D) of the present invention. These polyolefins may be the same or different in terms of their composition and density. Completely different kind of polyolefin may be also used. For example, the following combinations may be exemplified: a modified high-density polyethylene (A)—a high-density polyethylene (C), a modified linear low-density polyethylene (A)—a linear low-density polyethylene (C), a modified high-density polyethylene (A)—a linear low-density polyethylene (C), a modified high-density polyethylene (A)—an ethylenic elastomer such as an ethylene/butene copolymer or an ethylene/propylene copolymer (C), a modified isotactic homopolypropylene (A)—an isotactic random polypropylene (C), a modified isotactic random polypropylene (A)—an isotactic random polypropylene (C), a modified isotactic homopolypropylene (A)—a propylenic elastomer such as a propylene/ethylene copolymer (C), a modified isotactic random polypropylene (A)—an ethylenic elastomer such as an ethylene/butene copolymer or an ethylene/propylene copolymer (C), a modified isotactic random polypropylene (A)—a syndiotactic homopolypropylene (C), and others.

In particular, the density of the adhesive (D) is preferably 0.925 g/cm$^3$ or more, and more preferably 0.930 g/cm$^3$ or more. It is possible to provide such an excellent adhesive that has no degradation of the adhesion power, particularly at higher temperatures, so far as the density fits this range.

A preferred combination of the polyolefins, (A) and (C) constituting such an adhesive includes combinations of, for example, a modified high-density polyethylene (A) having a density of 0.940 g/cm$^3$ or more-a linear low-density polyethylene (C), a modified linear low-density polyethylene (A) having a density of 0.930 g/cm$^3$ or more-a blend (C) of a linear low-density polyethylene having a density of 0.930 g/cm$^3$ or more and an ethylenic elastomer, and others.

It is also possible to add any known additive such as a process stabilizer, a heat-resistant stabilizer, a thermal anti-aging agent, a filler or the like to the adhesive (D) of the present invention, so far as it does not impair the purpose of the present invention.

The adhesive (D) of the present invention is useful as an adhesive of an active-hydrogen containing polar resin (F) and a polyolefin (G), since carbodiimide groups of the adhesive form grafted structures in the main-chain of a polyolefin-based polymer, while keeping their reactivity with an active hydrogen contained in a carboxylic acid, amine, alcohol, thiol or the like.

Adhesion Enhancer (E)

It is preferable to add a so-called adhesion enhancer, especially in order to strengthen the adhesiveness in the present invention. Examples of such an adhesion enhancer are rosin derivatives, terpenic resins, petroleum resins, and their hydrogenated derivatives. Among them, hydrogenated terpenic resins and hydrogenated petroleum resins are preferable. It is preferable to add such an adhesion enhancer to the adhesive (D) in the range from 0 to 30 wt %.

In addition, it is also effective to add a modified resin having a group reactive with a carbodiimide group, for example, a resin modified with maleic acid and an imine-modified resin. Among them, preferable examples include ethylene/butene copolymer modified with maleic acid, ethylene/propylene copolymer modified with maleic acid, ethylene/octene copolymer modified with maleic acid, styrene/butene/butene/styrene copolymer modified with maleic acid, styrene/ethylene/butene/styrene copolymer modified with maleic acid, imine-modified styrene/butene/butene/styrene copolymer, and imine-modified styrene/ethylene/butene/styrene copolymer.

A laminate relating to the present invention is an article containing the above adhesive and is obtained by adhering known resins with the adhesive of the present invention. In particular, the adhesion performance to the following polar resins is especially excellent.

Polar Resin (F and F')

A polar resin (F and F') used in the present invention is a polymer which has an active hydrogen that is reactive with a carbodiimide group of the adhesive (D), and is derived from carboxylic acid, amine, alcohol, thiol or the like. Specifically, the polar polymer includes polyester, polyamide, polylactic acid, polycarbonate, acrylic resin, polyphenyleneoxide, polyethersulfone (PES), acrylonitrile/butadiene/styrene copolymer (ABS), a polyether such as ethylene/vinyl alcohol copolymer or polyacetal, and a polyolefin containing an active-hydrogen such as modified polyolefin, ethylene/ethyl acrylate copolymer, ethylene/methacrylic acid copolymer, ethylene/vinyl acetate copolymer or the like. The polar resin (F) used in the present invention may be used singly or in a combination of two or more.

Examples of the polyester are polyethylene terephthalate, waste polyethylene terephthalate for recycling, polyethylene naphthalate, polytrimethylene terephthalate, polybutylene terephthalate, a non-crystalline polyester such as glycol-modified polyethylene terephthalate or acid-modified polyethylene terephthalate, an aromatic polyester containing a biodegradable polyester such as polybutylene terephthalate adipate or polyethylene terephthalate succinate, a lactic acid-based resin such as polycaprolactone, polyhydroxybutyrate, polyglycolic acid, polylactic acid or the like, and other biodegradable polyester resins. In addition, a liquid crystalline polyester composed of a fully aromatic or partly aromatic polyester and polyarylate may also be used. Among them, polyethylene terephthalate, polybutylene terephthalate, polylactic acid and a liquid crystalline polyester are preferable.

Examples of the polyamide are an aliphatic polyamide such as nylon-6, nylon-66, nylon-10, nylon-12, nylon-46 and the like, an aromatic polyamide produced from an aromatic dicarboxylic acid and an aliphatic diamine, such as nylon-6T, nylon-9T and the like.

Examples of the polycarbonate are an aromatic bisphenol-based polycarbonate such as bisphenol A-polycarbonate or bisphenol F-polycarbonate and an aliphatic polycarbonate such as polyethylene carbonate, polytrimethylene carbonate or the like.

Examples of the polyacetal are polyformaldehyde (polyoxymethylene), polyacetoaldehyde, polypropionaldehyde, polybutylaldehyde and the like. Among them, polyformaldehyde is particularly preferable.

The ethylene/vinyl alcohol copolymer preferably contains 20 to 50 mol %, more preferably 25 to 48 mol %, of polymer units originating in ethylene. They may be prepared by saponification of the corresponding ethylene/vinyl acetate copolymers according to an ordinary method.

The adhesive (D) relating to the present invention may also be suitable as an adhesive because of strong adhesiveness to a polyolefin.

Polyolefin (G)

The polyolefin (G) used for a laminate in the present invention is the same as described above for the unmodified polyolefin (C) and has no particular limitation.

Multi-Layered Laminate

The laminate of the present invention comprises a structure of a multi-layered laminate formed by adhering a polar resin (F) and a polyolefin (G) or two or more kinds of polar resins (F and F') via the adhesive (D). Any combination of these layers may be used, so far as the above-described structure is maintained.

In addition, any preparation method may be applied to production of the laminate of the present invention. For example, the laminate may be prepared by such an ordinary method as blow molding, injection molding or extrusion molding, where a polar resin (F) and/or a polyolefin (G) for each layer is/are melted and laminated in a molten state via the molten adhesive (D). Furthermore, the multi-layered laminate may be prepared by extrusion lamination, where mold-processed sheets of a polar resin (F) and/or a polyolefin (G) are contacted and pressed together via the molten adhesive (D) that is spread on the sheets or films of the polar resin (F) and/or the polyolefin (G).

The adhesive may be used as a molded film or as dissolved in a solvent.

Examples of a layered structure of the laminate of the present invention are a three-layered structure such as polyethylene terephthalate/adhesive/polyolefin, polylactic acid/adhesive/polyolefin, polycarbonate/adhesive/polyolefin, polyethylene terephthalate/adhesive/nylon-6 and the like, a 5-layered structure such as polycarbonate/adhesive/ethylene vinyl alcohol copolymer/adhesive/polyolefin, polylactic acid/adhesive/ethylene vinyl alcohol copolymer/adhesive/polyolefin, polyolefin/adhesive/polyethylene terephthalate/adhesive/polyolefin, polyolefin/adhesive/liquid crystalline polyester/adhesive/polyolefin and the like.

EXAMPLES

The present invention is more concretely explained by the following Examples and Comparative Examples, but it is not limited by them, so far as the scope of the present invention is satisfied.

(Measurement Methods)

The following methods were applied to Examples and Comparative Examples of the present invention.

[Melt Flow Rate (MFR)]

According to the ASTM D1238, the measurement was carried out at 190° C. with a load of 2.16 kg.

[Interlayer Adhesion Strength of Film]

A peeling test was performed at an angle of 180 degree at 23° C. and 100° C. using a 3-layered laminate of polyethylene terephthalate (PET)/adhesive resin/a high-density polyethylene. [IR peak intensity Ratio (Carbodiimide/$CH_2$ peak ratio) of adhesive]

The ratio of a peak intensity (percentage) of a band at 2130 to 2140 $cm^{-1}$ due to stretching vibration of N=C=N group to a band at 1470 $cm^{-1}$ due to scissor vibration of $CH_2$ group of the polyolefin as an internal standard was determined.

[Density]

The density was measured by using a density gradient tube and a test piece of sheet which was prepared by annealing at 120° C. for 1 hour and then slowly cooling down to room temperature.

(Polyolefin Used)

Examples of the polyolefin used in the following Examples and Comparative Examples are shown below. These polymers were synthesized according to an ordinary method unless otherwise specified.

PE-1: Linear low-density polyethylene (LLDPE)
(Melt Flow Rate: 2.9, Density: 0.926 $g/cm^3$)
PE-2: LLDPE
(Melt Flow Rate: 2.0, Density: 0.920 $g/cm^3$)
PE-3: LLDPE
(Melt Flow Rate: 3.0, Density: 0.943 $g/cm^3$)
PE-4: LLDPE
(Melt Flow Rate: 3.0, Density: 0.963 $g/cm^3$)

Example 1

<Production of Polyolefin (A) Having a Group Reactive with a Carbodiimide Group>

An acetone solution dissolving 100 parts by weight of PE-1 (LLDPE manufactured by Mitsui Chemicals, Inc.), 1 part by weight of maleic anhydride (manufactured by Wako Pure Chemical Industries, Ltd., hereinafter abbreviated as MAH), and 0.06 part by weight of 2,5-dimethyl-2,5-bis(t-butylperoxy)hexane (trade name: PERHEXA 25B, manufactured by NOF CORPORATION,) was dry blended. A modified polyethylene with maleic anhydride (hereinafter abbreviated as MAH-PE) was obtained by extrusion using a biaxial extruder (TEX-30, manufactured by The Japan Steel Works, LTD.) at a resin temperature of 250° C., a screw rotation speed of 200 rpm and a discharge rate of 100 g/min. Thus obtained MAH-PE was dissolved in xylene and reprecipitated in acetone for purification. The content of the grafted maleic anhydride was determined to be 0.96 wt %.

<Evaluation of Adhesion Power of the Laminate>

The adhesion power (unit: N/15 mm) at the interface between a polyester layer and an adhesive layer of the prepared laminate, cut in a width of 15 mm, was measured by using a tension meter at a peeling angle of 180 degree, at 23° C. or 100° C.

A visual test of the appearance was performed to check whether fish eyes were observed on the sample or not. In Table 1, "AA" means good appearance without fish eye observed and "BB" means fish eye(s) observed.

TABLE 1

| Formulation | Example 1 | Example 2 | Example 3 | Example 4 | Example 5 | Comparative Example 1 | Comparative Example 2 | Comparative Example 3 |
|---|---|---|---|---|---|---|---|---|
| Maleimidized PE-1 (Density: 0.924 g/cm$^3$) (Part) | 10 | 10 | 10 | | | 10 | 10 | 100 |
| Polycarbodiimide (Part) | 3 | 3 | 3 | 3.3 | 3.5 | 3 | | 10 |
| PE-2 (Density: 0.920 g/cm$^3$) (Part) | 90 | 90 | 90 | | | 90 | 90 | |
| Maleimidized PE-3 (Density: 0.941 g/cm$^3$) (Part) | | | | 10 | | | | |
| PE-3 (Density: 0.943 g/cm$^3$) (Part) | | | | 90 | 90 | | | |
| Maleimidized PE-4 (Density: 0.961 g/cm$^3$) (Part) | | | | | 10 | | | |
| Total Parts | 103 | 103 | 103 | 103 | 104 | 103 | 100 | 110 |
| Kneading temperature with PLASTOMILL (° C.) | 230 | 250 | 270 | 250 | 250 | 200 | 250 | 250 |
| Density of adhesive | 920 | 920 | 920 | 945 | 947 | 920 | 920 | — |
| IR analysis of adhesive (peak intensity ratio) Carbodiimide/CH$_2$ vibration ratio (%) | 39 | 39 | 33 | 38 | 37 | 56 | 0 | — |
| Peeling strength at 23° C. (N/15 mm) | 14 | 18 | 18 | 20 | 21 | 11 | 0 | — |
| Peeling strength at 100° C. (N/15 mm) | 24 | 25 | 28 | 33 | 37 | 19 | 0 | — |
| Fish eyes | AA | AA | AA | AA | AA | AA | AA | BB |

<Production of Adhesive>

The adhesives 1 to 5 were produced by melt kneading of 10 parts by weight of the above-prepared MAH-PE, 90 parts by weight of PE-2 (LLDPE, manufactured by Mitsui Chemicals, Inc.), and a predetermined part (part by weight) described in Table 1 of polycarbodiimide (trade name: Carbodilite HMV-8CA, manufactured by NISSHINBO INDUSTRIES, INC.), using a LABO PLASTOMILL (manufactured by Toyo Seiki Seisaku-sho, Ltd.) at 230° C. and 100 rpm for 2 min.

All the samples had a thickness of 100 micrometer.

The polyester resin layer was polyethylene terephthalate (trade name: Lumirror S10, manufactured by Toray Industries Inc.; hereinafter abbreviated as PET-S10) with a film thickness of 300 micrometer.

The polyolefin resin layer was a high-density polyethylene having a melt flow rate of 12.0 and a density of 0.961 g/cm$^3$ (HDPE, manufactured by Mitsui Chemicals, Inc.; hereinafter abbreviated as HDPE) with 3 layers of film, each having a thickness of 100 micrometer.

The adhesive layer was prepared by kneading an adhesive by using LABO PLASTOMILL and then molding the kneaded adhesive by cold press at 30° C. with 50 kg/cm$^2$ for 5 min to form a 100 micrometer-thick film.

<Production of Laminate>

A laminate was prepared by overlaying 3 sheets of a 100 micrometer film of HDPE to form a 300 micrometer-thick polyolefin resin layer. A 100 micrometer-thick adhesive film was superposed on the resin layer, and further PET-S10 thereon, followed by press adhesion. That is, films or sheets of HDPE, the adhesive, and PET-S10 were successively overlaid and pressed for melt-adhesion from the PET-S10 side with a hot plate (width of 60 cm) at 240° C. under a pressure of 50 kg/cm$^2$ for 2 min to form the laminate.

In Example 1, the adhesion power was 14 N/15 mm at 23° C. and 24 N/15 mm at 100° C. The adhesion power did not decrease, but increased by increasing the temperature. The IR measurement of the adhesive gave 39% of the ratio of a peak intensity of NCN peak to CH$_2$ peak, while the value of the same parameter of Comparative Example 1 was 56% after the reaction at 200° C. That is, it is found that the NCN peak intensity decreased as the reaction proceeded.

Examples 2 to 3

An adhesive (D) and a laminate were prepared according to the same procedure as described in Example 1 except that the temperature of melt kneading of MAH-PE, LLDPE-1 and a polycarbodiimide using a LABO PLASTOMILL manufactured by Toyo Seiki Seisaku-sho, Ltd. was changed as shown in Table 1.

Table 1 shows properties of the resulting adhesives (D) and test results of thus formed laminates. It was found that the carbodiimide peak decreased as the reaction proceeded in the case of the melt kneading at higher temperatures. The adhesion was excellent in this case.

Examples 4 to 5

An adhesive (D) and a laminate were prepared according to the same procedure as described in Example 1 except that the density of PE used for the components of MAH-PE and PE used in Example 1 was changed.

Table 1 shows properties of the resulting adhesives (D) and test results of thus formed laminates.

The adhesion of an adhesive obtained by using a high-density PE was excellent.

Comparative Example 1

An adhesive (D) and a laminate were prepared according to the same procedure as described in Example 1 except that the reaction temperature was changed to 200° C. in Example 1.

The carbodiimide peak of the resulting adhesive (D) remained so much that the reaction did not proceed efficiently. The adhesion of the resulting adhesive (D) was inferior to that of Example 1.

Comparative Example 2

An adhesive (D) and a laminate were prepared according to the same procedure as described in Example 1 except that a polycarbodiimide was not added in Example 1.

The resulting adhesive (D) had no adhesion power.

Comparative Example 3

An adhesive (D) and a laminate were prepared according to the same procedure as described in Example 1 except that a composition of the adhesive was changed in Example 1.

The crosslinking occurred during production of an adhesive (D) in this case, so that the resulting adhesive had no adhesion power.

In addition, a defect of so-called fish eyes was observed, and the resulting sample showed poor appearance.

INDUSTRIAL APPLICABILITY

According to the present invention, it is possible to efficiently manufacture such an adhesive (D) having an excellent adhesion power that has a carbodiimide chain and a polyolefin chain aligned on the same chain, by reaction of a polyolefin (A) having a group reactive with a carbodiimide group and a compound (B) containing a carbodiimide group in the presence of an unmodified polyolefin (C) under a specific condition.

Furthermore, the use of a high-density polyolefin (A) having a group reactive with a carbodiimide group leads to maintain an excellent adhesion power of the resulting adhesive (D) even at high temperatures.

It is thus possible to produce a laminate having an excellent interlayer adhesion power at high temperatures by using the adhesive of the present invention.

There is no limit in application of the laminate of the present invention, and it is possible to use it for an application requiring an excellent adhesion at high temperatures such as a food packaging film useful for high-temperature sterilization, a packaging material such as retort pouch, and a food packaging cup.

The invention claimed is:

1. An adhesive for extrusion molding obtained by reacting a polyolefin (A) having a group reactive with a carbodiimide group and a compound (B) containing a carbodiimide group in the presence of an unmodified polyolefin (C),
   wherein said adhesive has a ratio of a peak intensity at 2130 to 2140 $cm^{-1}$ to a peak intensity at 1470 $cm^{-1}$ of 50% or less and not including 0%, and
   a polyolefin having a density of 0.925 to 0.980 $g/cm^3$ is used as a raw material of a polyolefin (A) having a group reactive with a carbodiimide group.

2. The adhesive according to claim 1 obtained by reacting a polyolefin (A) having a group reactive with a carbodiimide group and a compound (B) containing a carbodiimide group in the presence of an unmodified polyolefin (C) at 230 to 280° C.

3. The adhesive according to claim 1, wherein a polyolefin (A) having a group reactive with a carbodiimide group satisfies the following equation (1):

$$0.3 < Mn/(100*f/M) < 3.0 \tag{1}$$

wherein f denotes a formula weight (g/mol) of a compound having a group reactive with a carbodiimide group, M denotes a content (wt %) of residue of a compound having a group reactive with a carbodiimide group, and Mn denotes a number-average molecular weight of the polyolefin (A).

4. A laminate containing at least one layer of the adhesive according to claim 1.

5. An adhesive obtained for extrusion molding by reacting a polyolefin (A) having a group reactive with a carbodiimide group and a compound (B) containing a carbodiimide group in the presence of an unmodified polyolefin (C) at 250 to 270° C.,
   wherein said adhesive has a ratio of a peak intensity at 2130 to 2140 $cm^{-1}$ to a peak intensity at 1470 $cm^{-1}$ of 50% or less and not including 0%, and
   a polyolefin having a density of 0.925 to 0.980 $g/cm^3$ is used as a raw material of a polyolefin (A) having a group reactive with a carbodiimide group.

* * * * *